US012390948B2

(12) United States Patent
Lee et al.

(10) Patent No.: US 12,390,948 B2
(45) Date of Patent: Aug. 19, 2025

(54) DEVICE FOR CUTTING DIAGNOSTIC REAGENT PAPER INTO STRIP

(71) Applicants: Seok Hyun Lee, Seoul (KR); Won Ha Lee, Seoul (KR)

(72) Inventors: Seok Hyun Lee, Seoul (KR); Won Ha Lee, Seoul (KR)

( * ) Notice: Subject to any disclaimer, the term of this patent is extended or adjusted under 35 U.S.C. 154(b) by 280 days.

(21) Appl. No.: 18/028,848

(22) PCT Filed: Oct. 14, 2021

(86) PCT No.: PCT/KR2021/014169

§ 371 (c)(1),
(2) Date: Mar. 28, 2023

(87) PCT Pub. No.: WO2022/080875

PCT Pub. Date: Apr. 21, 2022

(65) Prior Publication Data

US 2023/0330886 A1 Oct. 19, 2023

(30) Foreign Application Priority Data

Oct. 16, 2020 (KR) ........................ 10-2020-0134308

(51) Int. Cl.
*B26D 7/26* (2006.01)
*B26D 1/24* (2006.01)

(52) U.S. Cl.
CPC ........... *B26D 7/2635* (2013.01); *B26D 1/245* (2013.01)

(58) Field of Classification Search
CPC .............................. B26D 7/2635; B26D 1/245
See application file for complete search history.

(56) References Cited

U.S. PATENT DOCUMENTS 620,944 A * 3/1899 Mather .................. B26D 1/245 83/675
1,673,336 A * 6/1928 Lehmicke .............. B26D 1/245 83/122

(Continued)

FOREIGN PATENT DOCUMENTS

JP H07-266292 10/1995
JP 2009-136930 6/2009

(Continued)

*Primary Examiner* — Sean M. Michalski
(74) *Attorney, Agent, or Firm* — LEX IP MEISTER, PLLC

(57) ABSTRACT

The present invention is configured such that a guide bar for supporting a diagnostic reagent paper includes a groove and the groove prevents the diagnostic reagent paper from being supported by a guide member in a section where knives using a shear force cut the diagnostic reagent paper, whereby a pressed line generated when the guide member presses the diagnostic reagent paper due to a cutting force by the knives is prevented from being formed on a strip so as to eliminate defects of the strip. In particular, the present invention is configured such that the guide member is installed to be disposed to pass through a space between a first shaft and a second shaft, each formed by repeatedly arranging two knives facing each other and one space, so as to guide the diagnostic reagent paper, whereby a section through which the diagnostic reagent paper passes has a substantially rectangular shape. Therefore, not only can the diagnostic reagent paper cut into strips accurately by a blade, but also the cut strips have no defects such as bending, entangling, or twisting.

8 Claims, 10 Drawing Sheets

(56) References Cited

U.S. PATENT DOCUMENTS

| | | | | | |
|---|---|---|---|---|---|
| 1,866,941 | A * | 7/1932 | Peters | B23D 33/02 | 83/89 |
| 3,173,326 | A * | 3/1965 | Gulliksen | D06H 7/04 | 83/507 |
| 3,762,254 | A * | 10/1973 | Tsymbal | B23D 33/02 | 83/167 |
| 3,921,488 | A * | 11/1975 | Mastriani | B26D 5/04 | 83/505 |
| 4,010,677 | A * | 3/1977 | Hirakawa | B26D 7/2635 | 83/885 |
| 4,275,631 | A * | 6/1981 | Wingen | B23D 19/08 | 83/504 |
| 4,282,996 | A * | 8/1981 | Maeda | B23D 19/06 | 83/108 |
| 4,428,265 | A * | 1/1984 | Bolton | B26D 7/2635 | 83/504 |
| 5,072,641 | A * | 12/1991 | Urban | B26D 7/2635 | 83/508.3 |
| 5,107,735 | A * | 4/1992 | Ramun | H01B 15/006 | 83/947 |
| 5,129,299 | A * | 7/1992 | Fischer | B26D 7/0683 | 83/121 |
| 5,138,921 | A * | 8/1992 | Winckler | B26D 1/245 | 83/498 |
| 5,152,206 | A * | 10/1992 | Mulling | B26D 7/06 | 83/436.15 |
| 5,158,525 | A * | 10/1992 | Nikkel | B31F 1/10 | 384/248 |
| 5,259,255 | A * | 11/1993 | Urban | B26D 7/2635 | 83/508.3 |
| 5,285,707 | A * | 2/1994 | Lodovico | B26D 3/005 | 241/DIG. 31 |
| 5,924,347 | A * | 7/1999 | Soderlund | B23D 35/007 | 83/698.41 |
| 6,058,822 | A * | 5/2000 | Parke | B02C 18/142 | 83/425.2 |
| 7,011,005 | B2 * | 3/2006 | Koutonen | B26D 11/00 | 83/508.3 |
| 7,134,372 | B2 * | 11/2006 | Flaherty | B23D 35/004 | 83/508.3 |
| 7,350,387 | B1 * | 4/2008 | Lisk | B21D 31/046 | 83/425.3 |
| 7,533,665 | B2 * | 5/2009 | Hamilton | B28D 5/029 | 83/664 |
| 7,546,789 | B2 * | 6/2009 | Reddell | B26D 7/32 | 83/122 |
| 7,673,545 | B1 * | 3/2010 | Giberson | B26D 1/15 | 83/881 |
| 7,861,754 | B2 * | 1/2011 | Mitchell | B27B 7/04 | 83/508.3 |
| 8,221,873 | B2 * | 7/2012 | Nagao | G03C 11/00 | 83/56 |
| 8,813,622 | B2 * | 8/2014 | Schoenbeck | B23D 35/007 | 83/498 |
| 9,561,532 | B2 * | 2/2017 | Takamura | B21D 13/045 | |
| 11,858,772 | B2 * | 1/2024 | Lee | B26D 7/08 | |
| 2003/0209115 | A1 * | 11/2003 | Burkart | B26D 7/2635 | 83/504 |
| 2010/0080974 | A1 * | 4/2010 | Nagao | G03C 11/00 | 83/56 |
| 2011/0283855 | A1 * | 11/2011 | Kwarta | B26D 7/2635 | 83/499 |
| 2014/0116218 | A1 * | 5/2014 | Kwarta | B26D 7/2635 | 83/562 |
| 2022/0063951 | A1 * | 3/2022 | Lee | B26D 1/245 | |

FOREIGN PATENT DOCUMENTS

| | | |
|---|---|---|
| JP | 2014-012327 | 1/2014 |
| KR | 10-2014-0108009 | 9/2014 |
| KR | 10-2249224 | 5/2021 |

* cited by examiner

[FIG 1]
(a)
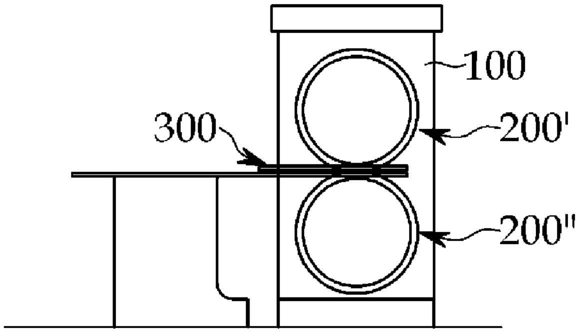
(b)
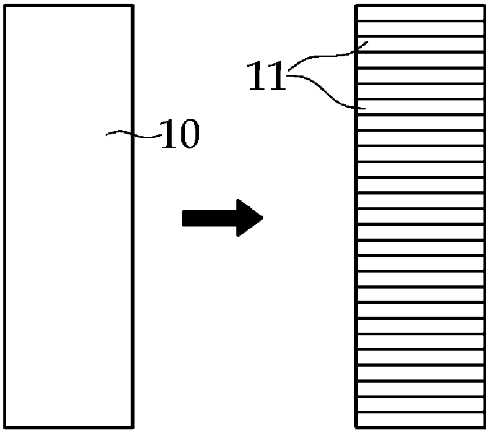

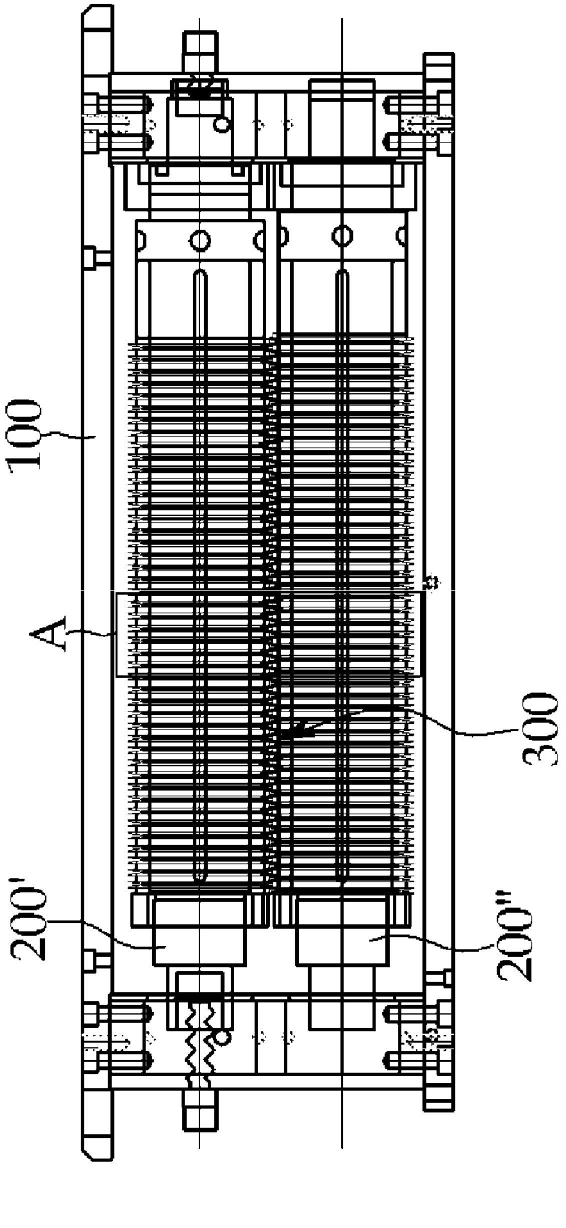
[FIG 2]

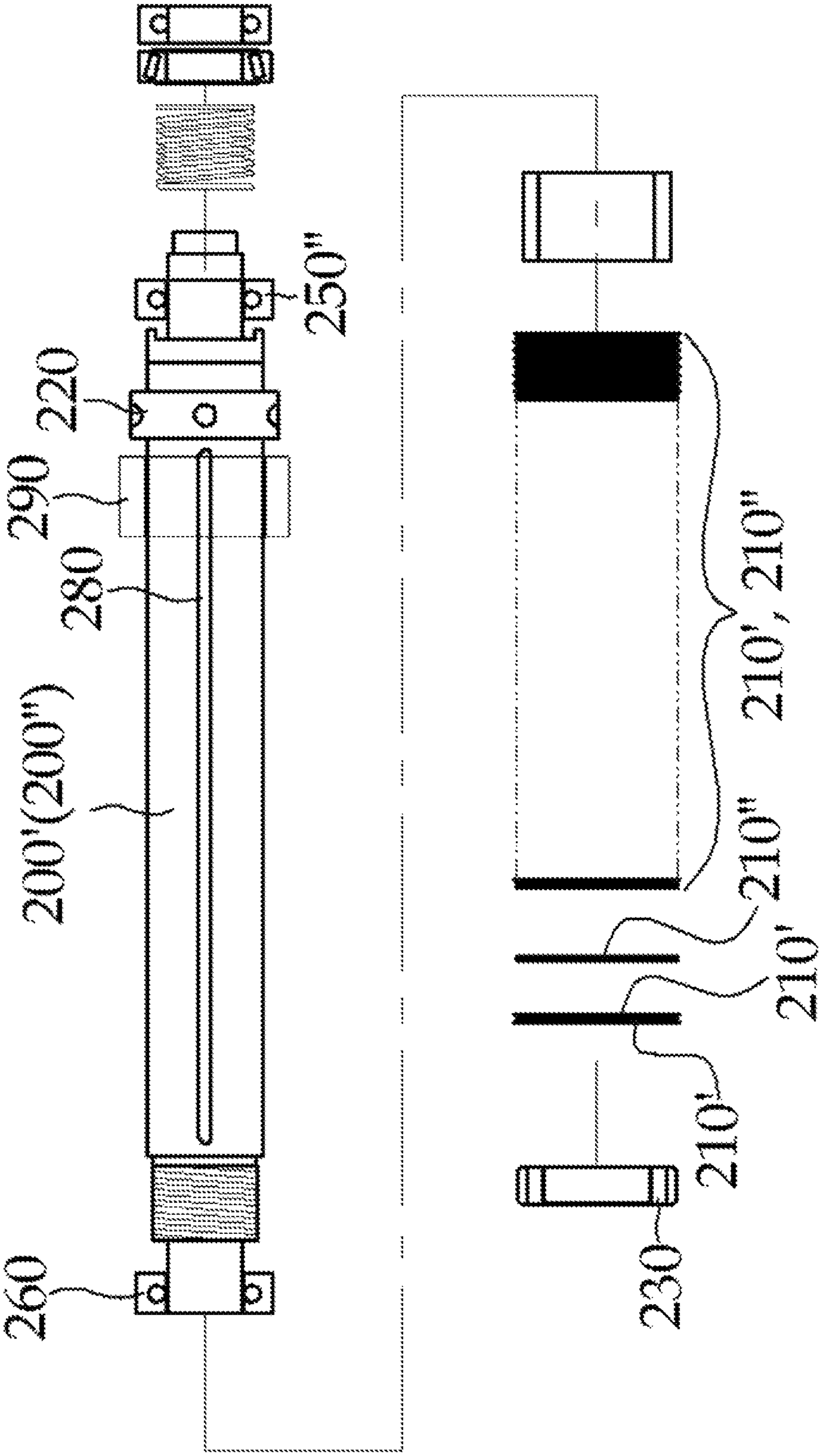
[FIG 3]

[FIG 4]
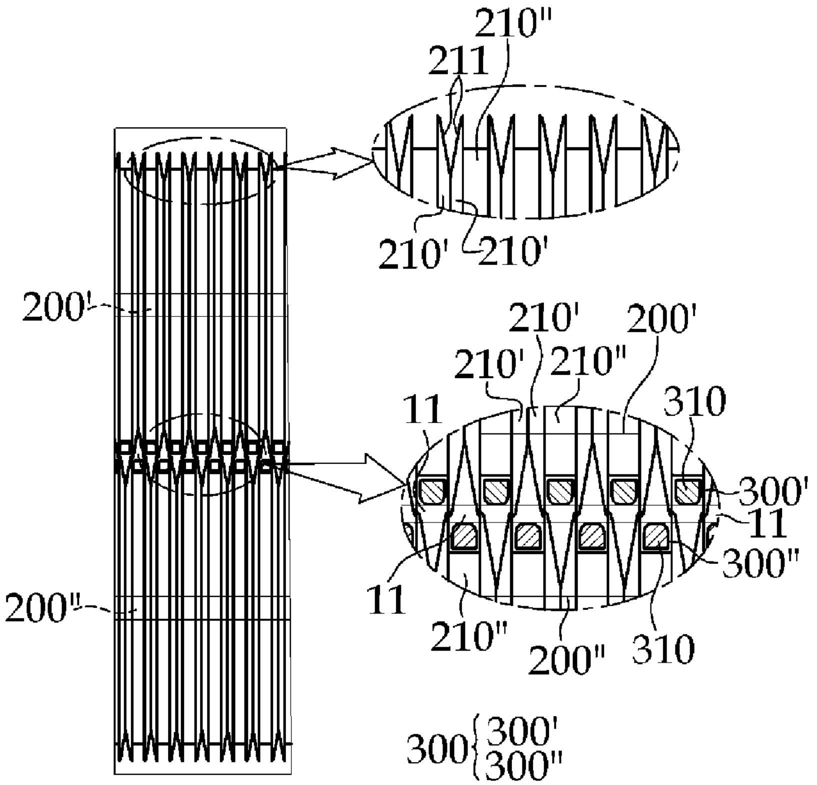

[FIG 5]
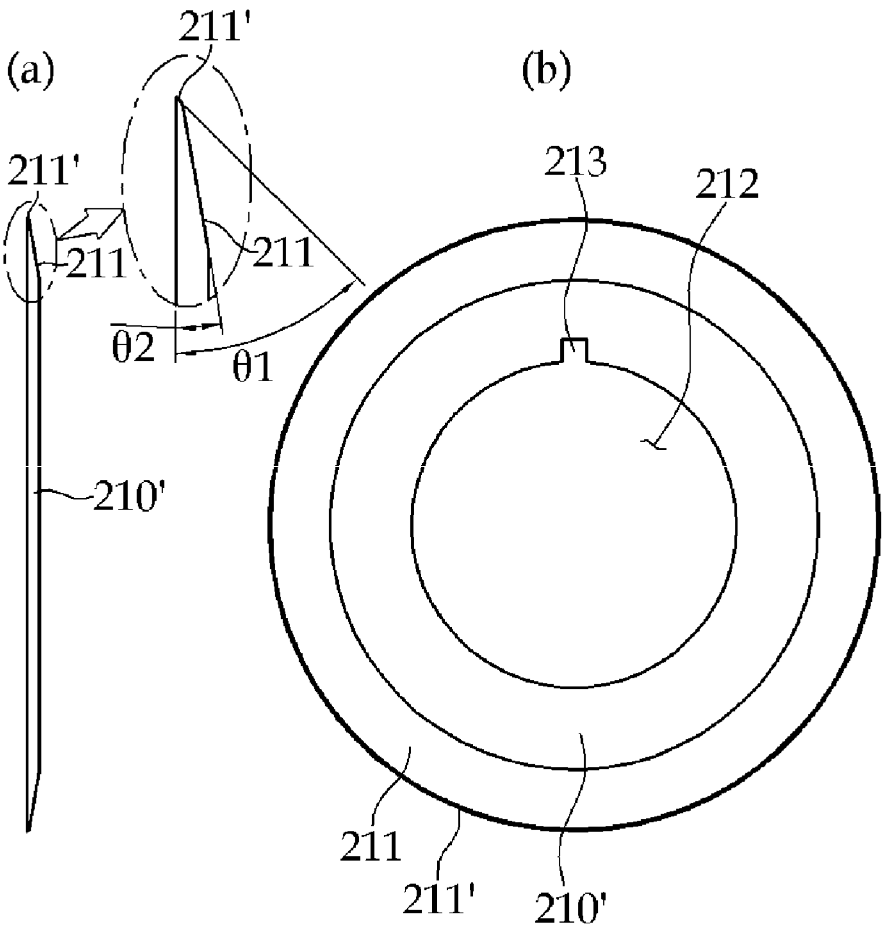

[FIG 6]
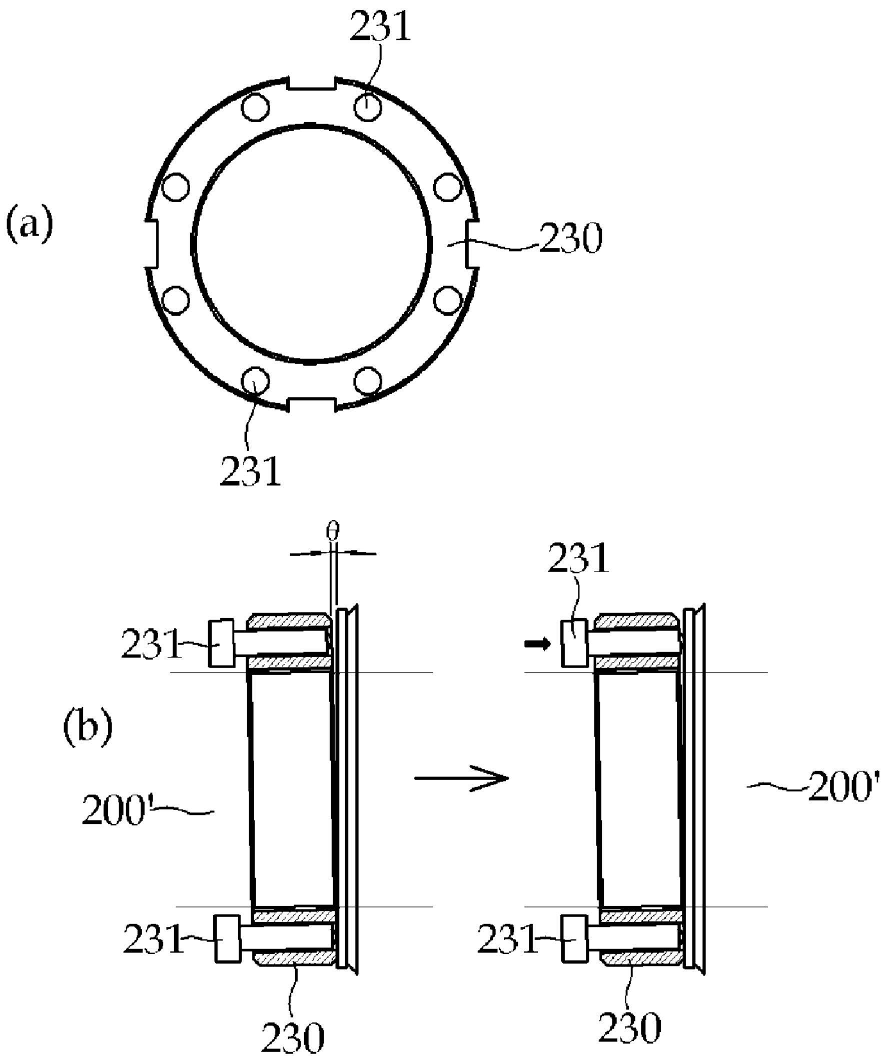

[FIG 7]
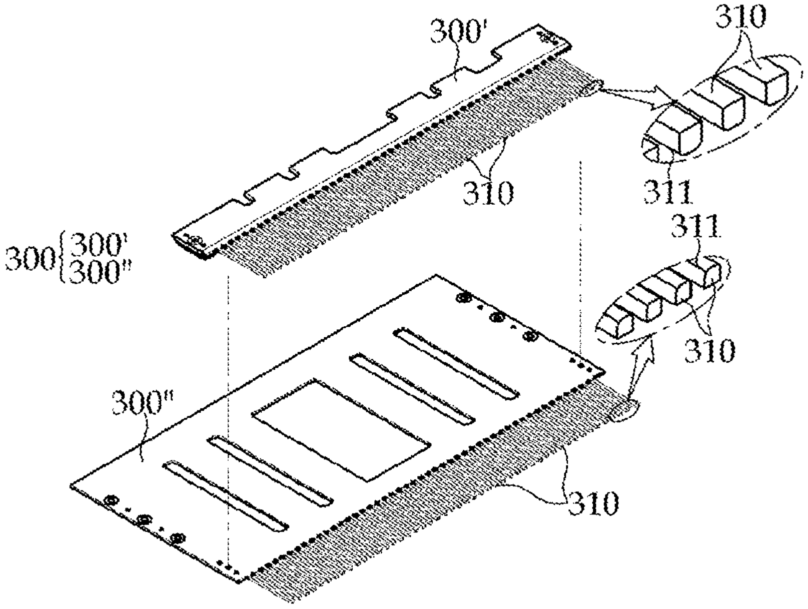
[FIG 8]
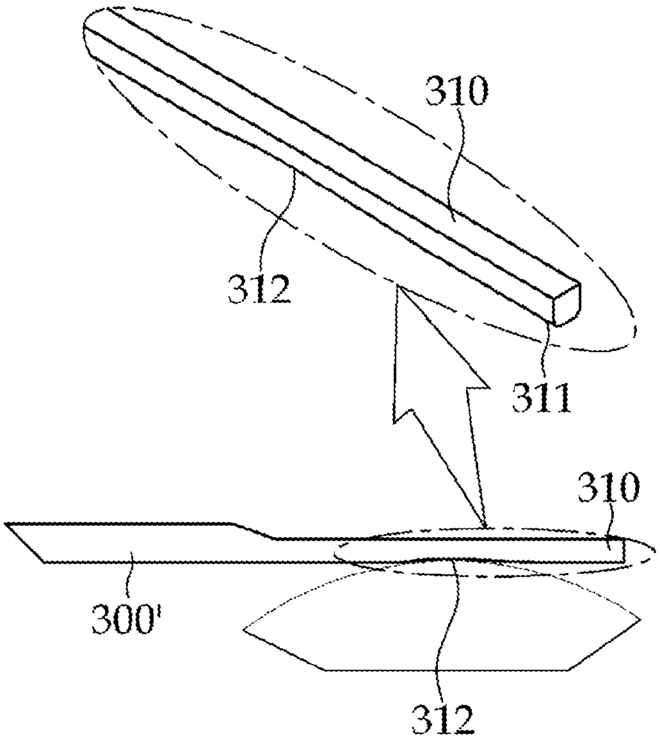

[FIG 9]
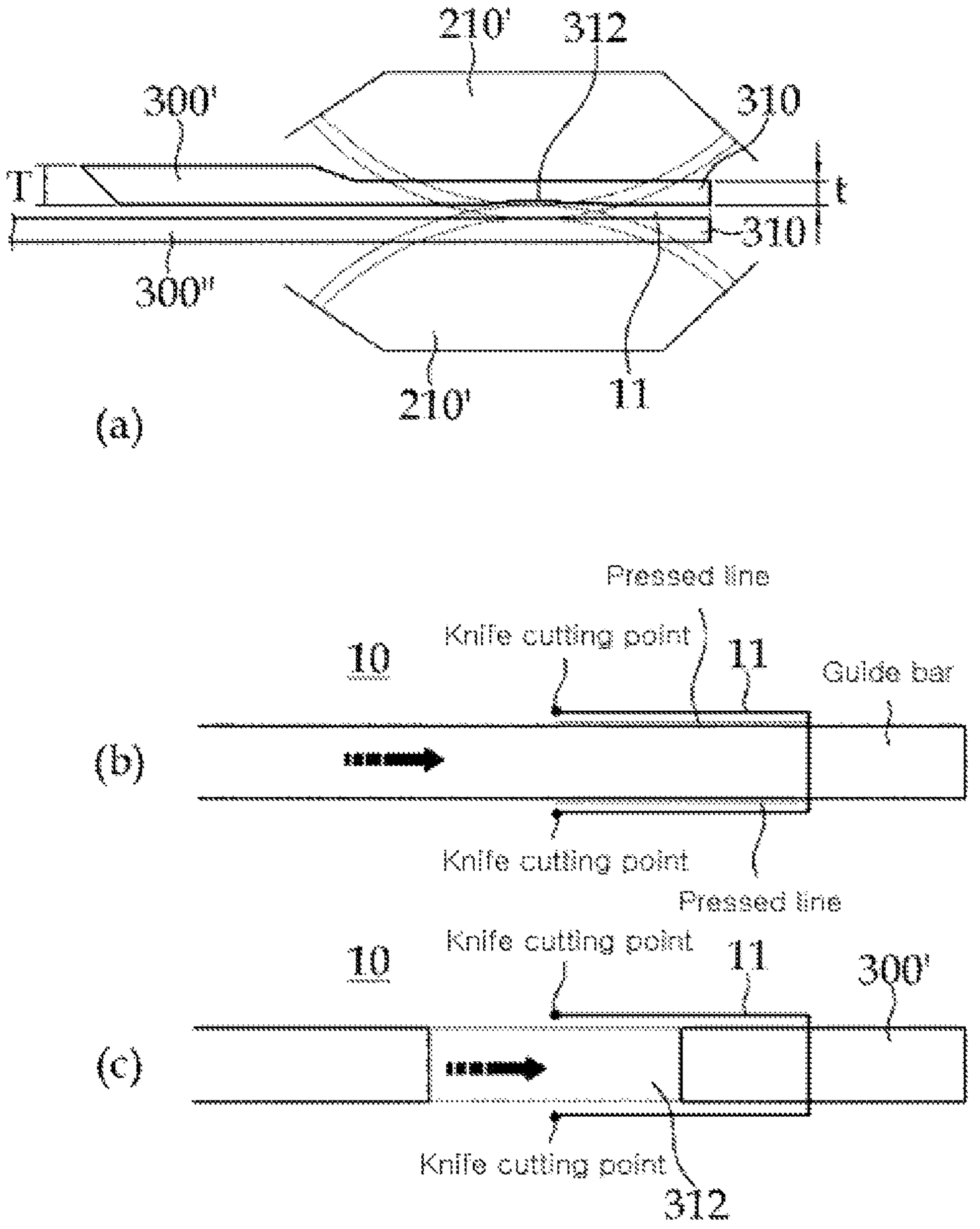

[FIG 10]
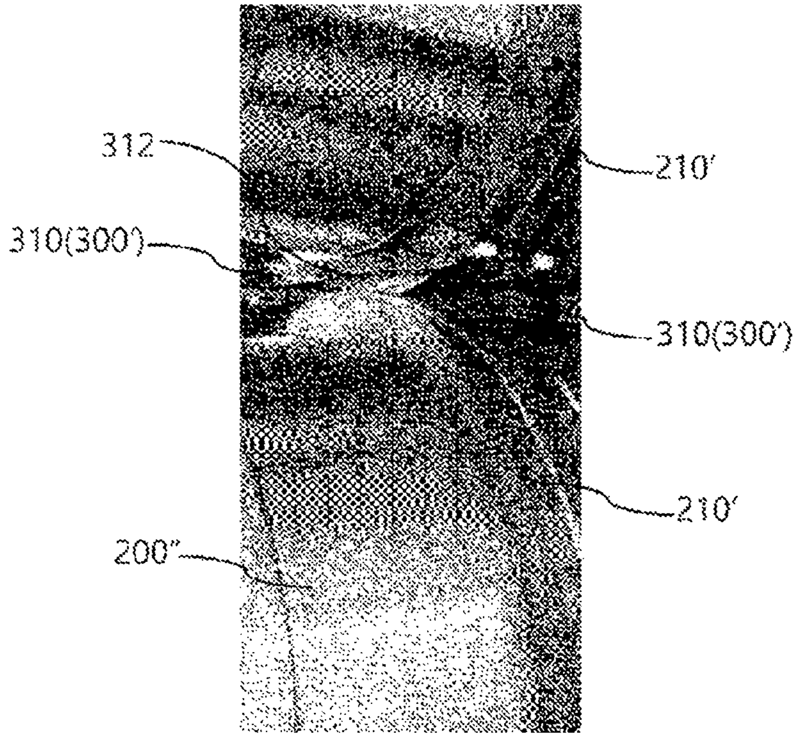

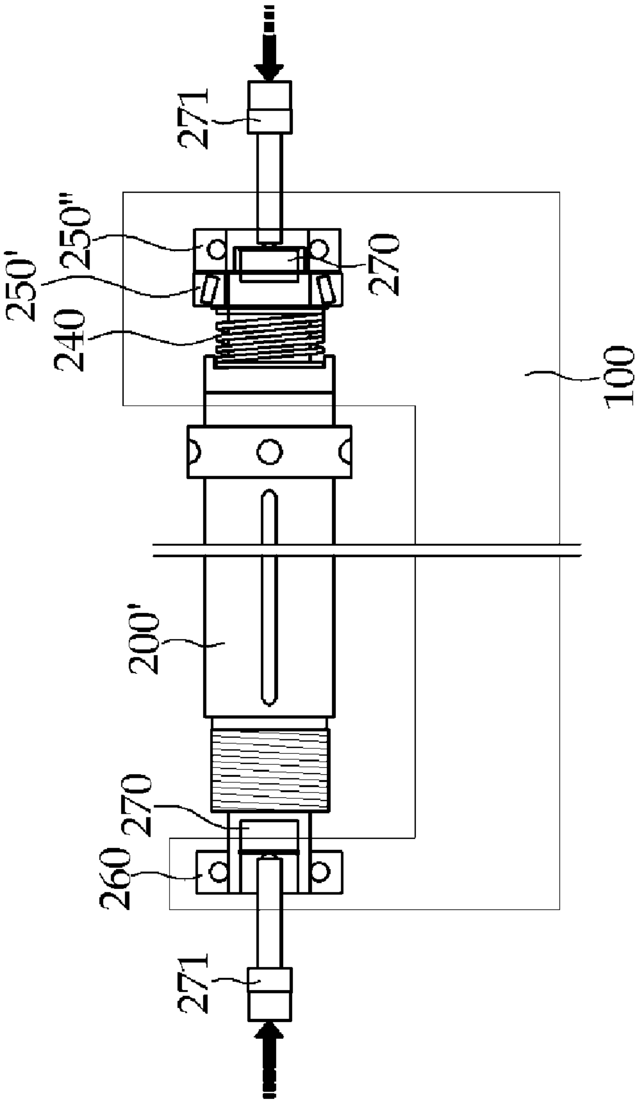
[FIG 11]

DEVICE FOR CUTTING DIAGNOSTIC REAGENT PAPER INTO STRIP

TECHNICAL FIELD

The present invention relates to a device for cutting a band-shaped diagnostic reagent paper into diagnostic strips with given sizes, and more specifically, to a device for cutting a diagnostic reagent paper into strips that is capable of allowing a guide member adapted to support both surfaces of the diagnostic reagent paper, when the diagnostic reagent paper is cut, to have grooves formed on give portions where the cutting is generated, so that the portions of the diagnostic reagent paper to be cut by knives through the shear forces of the knives are not supported against the guide member by means of the grooves, thereby preventing pressed lines from being formed along both sides of the cut strips in longitudinal directions of the strips to avoid the defects of the strips. Further, the present invention relates to a device for cutting a diagnostic reagent paper into strips that is capable of allowing a guide member to pass through a space between first and second shafts each having two knives whose blades face each other and one spacer repeatedly fitted thereto to thus guide both surfaces of the diagnostic reagent paper, so that in a state where both surfaces of the diagnostic reagent paper are stably supported against the guide member, the strips are cut well and prevented from rolling up, thereby avoiding the cut strips from being bent or twisted to reduce a defect rate of the strips. Further, the present invention relates to a device for cutting a diagnostic reagent paper into strips that is capable of allowing each of knives to have an angle for forming a cutting edge serving to perform real cutting greater than an angle for forming a blade, so that both edges of each strip cut are stably supported to thus prevent the strips from being deformed, twisted or bent.

BACKGROUND ART

Generally, a band-shaped diagnostic reagent paper is made and thus cut into diagnostic strips (kits) by means of various cutting machines as disclosed in Patent literatures 1 to 3.

(Patent Literature 1) Korean Patent No. 10-1617095

Disclosed is a strip cutting device for a diagnostic reagent paper. The conventional device includes a cutter having an upper knife and a lower knife for cutting a diagnostic card, a cutter driver for reciprocating the upper knife in a vertical direction to continuously obtain a first diagnostic strip and a second diagnostic strip from the diagnostic card, a diagnostic card transfer part for step by step moving the diagnostic card to a cutting region between the upper knife and the lower knife, a first vacuum block and a second vacuum block for holding the first diagnostic strip and the second diagnostic strip, respectively, and a diagnostic strip unloading part for moving the first vacuum block and the second vacuum block to an unloading region from the cutting region and expanding a distance between the first vacuum block and the second vacuum block.

(Patent Literature 1) Korean Patent No. 10-1859280

Disclosed is a strip cutting device for a diagnostic reagent paper. The conventional device includes an upper cutting roller having circular upper blades fitted thereto to cut a diagnostic card into a plurality of diagnostic strips, a lower cutting roller having circular lower blades fitted thereto correspondingly to the circular upper blades, a cleaning liquid supply part disposed above the upper cutting roller to supply a cleaning liquid for removing foreign matters from the circular upper blades and the circular lower blades, and a collection container disposed under the lower cutting roller to collect the foreign matters removed from the circular upper blades and the circular lower blades.

(Patent Literature 3) Korean Patent No. 10-2031214

Patent literature 3 relates to a test strip cutting and detecting device for making an in-vitro diagnostic kit. The conventional device includes a supply part for sensing whether an uncut sheet is located in right position by means of a first camera, a circular rotation cutter located behind the supply part to cut the uncut sheet into a plurality of strips, a strip supply part located behind the circular rotation cutter to move the strips, while the strips being open in distance therebetween, and a strip defect discriminator located on the side of the strip supply part to discriminate whether defects occur on the membrane surfaces of the strips, whereby without any interference of a worker, the uncut sheet can be cut into the plurality of strips at once, while it is quickly checked whether the plurality of strips are defective or not, thereby automatically performing the strip making and the detection for the defective strips. In specific, through the simple process of allowing the uncut sheet to enter the supply part, the strip making and the detection for the defective strips can be automatically carried out, and the defect detection is performed by means of a second camera, thereby improving the detecting efficiency and the product performance. In cutting the uncut sheet into the plurality of strips, the strips whose membrane surfaces are defective can be automatically discriminated easily from the strips by means of the strip defect discriminator, so that there is no need to destroy the uncut sheet, thereby decreasing the manufacturing cost and improving the production efficiency.

However, the existing cutting methods where the diagnostic reagent paper is inserted between the two rollers and thus cut into the plurality of strips have the following problems.

Firstly, like a method in which the diagnostic reagent paper is cut into the plurality of strips at once by a plurality of scissors, the diagnostic reagent paper is cut by using the two knives, so that the cut strip may be inclined or bent toward any side thereof.

Secondly, in a state where each strip cut on the diagnostic reagent paper is caught to a space between the knives, the shaft rotates to cause the strip to be bent, twisted, or fitted, thereby increasing defects of the strips cut.

Thirdly, the strips bent or inclined toward any side thereof may be used for the purpose of diagnosis, but if it is desired to insert each strip into a predetermined position such as a diagnostic kit, it is difficult to insert the bent or inclined strip into the diagnostic kit.

Lastly, if the strips are made in the existing cutting methods, the bent or twisted strips may not be used as products, thereby increasing a defect rate of the strips and making a manufacturing efficiency of the diagnostic kit deteriorated.

DISCLOSURE

Technical Problem

Accordingly, the present invention has been made in view of the above-mentioned problems occurring in the related art, and it is an object of the present invention to provide a device for cutting a diagnostic reagent paper into strips that is capable of allowing a guide member with guide bars adapted to support the diagnostic reagent paper to have grooves formed thereon, so that on the portions of the diagnostic reagent paper cut by knives using shear forces are not supported against the guide member by means of the grooves, thereby preventing the pressed lines occurring by the pressurization of the guide member through the shear forces of the knives from being formed on the strips to avoid the defects of the strips.

It is another object of the present invention to provide a device for cutting a diagnostic reagent paper into strips that is capable of allowing a guide member to pass through a space between first and second shafts each having two knives whose blades face each other and one spacer repeatedly fitted thereto to thus guide the diagnostic reagent paper, so that sections through which the diagnostic reagent paper passes have substantially rectangular shapes to enable the diagnostic reagent paper to be cut accurately into the strips and prevent the cut strips from being bent, entangled, or twisted.

It is yet another object of the present invention to provide a device for cutting a diagnostic reagent paper into strips that is capable of allowing a first shaft whose both ends are supported against thrust bearings to be adjusted in a longitudinal direction thereof by using adjustment screws, so that a distance adjustment from a second shaft can be more precisely achieved to enhance the cutting efficiency of the strips.

Technical Solution

To accomplish the above-mentioned objects, according to the present invention, there is provided a device for cutting a diagnostic reagent paper into strips, which is adapted to cut the diagnostic reagent paper (10) provided to the shape of a sheet into the strips (11) at once in a transverse direction thereof, including: a frame (100); a first shaft (200') having two disc-shaped knives (210') whose blades (211) face each other and one spacer (210") alternately fixedly fitted repeatedly thereto, without rotating, and an adjustment nut (230) fastenedly fixed to at least one side thereof to prevent the knives (210') and the spacers (210") from escaping therefrom; a second shaft (200") having two disc-shaped knives (210') whose blades (211) face each other and one spacer (210") alternately fixedly fitted repeatedly thereto, without rotating, and an adjustment nut (230) fastenedly fixed to at least one side thereof to prevent the knives (210') and the spacers (210") from escaping therefrom; and a guide member (300) mounted onto the frame (100) and having a first guide member (300') disposed on the spacers (210") of the first shaft (200') and a second guide member (300") disposed on the spacers (210") of the second shaft (200"), so that the diagnostic reagent paper (10) is supportedly guided, passes through a space between the first guide member (300') and the second guide member (300"), and is thus cut, wherein as the first shaft (200') and the second shaft (200") are mounted on the frame (100) to rotate in place together, the knives (210") cut the diagnostic reagent paper (10) into the plurality of strips (11) by means of the shear forces thereof, the first shaft (200') and the second shaft (200") each having at least two or more concentricity adjustment screws (231) fastened on an imaginary circle with respect to the center thereof to each adjustment nut (230) fastenedly fixed thereto to pressurize the knives (210') and the spacers (210") in the transverse direction and to thus adjust the concentricity of the knives (210') and the spacers (210"), and the first guide member (300') and the second guide member (300") each has a plurality of guide bars (310) protruding therefrom and thus fitted to the spaces between the crossing knives (210'), each guide bar (310) having both rounded corners (311) on the surface facing the diagnostic reagent paper (10) passes through the space between the first guide member (300') and the second guide member (300"), and the guide bars (310) of at least one of the first guide member (300') and the second guide member (300") having grooves (321) formed on given portions where the diagnostic reagent paper (10) is cut by the knives (210') fitted to the first shaft (200') and the second shaft (200") to prevent the diagnostic reagent paper (10) from being pressed by the guide bars (310).

In specific, the first angle (θ1) for forming a cutting edge (211') formed on the periphery of each knife (210') may be greater than a second angle (θ2) for forming the blade (211).

In this case, the first angle (θ1) may be set in the range of 43 to 47°, and the second angle (θ2) may be set in the range of 8 to 12°.

Further, the first guide member (300') may have a greater thickness (T) of a portion supporting the guide bars (310) than a thickness (t) of each guide bar (310), and an entrance portion of the first guide member (300'), into which the diagnostic reagent paper (10) is inserted, may become low in thickness toward a direction into which the diagnostic reagent paper (10) is inserted.

Moreover, the first shaft (200') may have a compression bearing (240), a taper bearing (250'), a bearing (250"), and a thrust bearing (270) sequentially fitted to one side thereof, the thrust bearing (270) being connected to an adjustment screw (271) disposed on the first shaft (200') to rotate in place, so that the first shaft (200') is adjusted in length in a longitudinal direction thereof, and the first shaft (200') may have a bearing (260) and a thrust bearing (270) sequentially fitted to the other side thereof, the bearing (260) being adapted to support the rotation and longitudinal movement of the first shaft (200') and the thrust bearing (270) being connected to an adjustment screw (271) disposed on the frame (100) to support the rotation of the first shaft (200') as the adjustment screw (271) rotates in place.

Advantageous Effects

The device for cutting the diagnostic reagent paper into the diagnostic strips according to the present invention has the following advantages.

Firstly, the guide member passes through the space between the first shaft and the second shaft used for cutting, while supporting both surfaces of the diagnostic reagent paper, and next, the diagnostic reagent paper is cut into each strip by means of the two knives whose blades face each other, so that the space through which the diagnostic reagent paper passes has the substantially rectangular shape, thereby preventing the cut strip from escaping therefrom or bent to remove a defect of the strip.

Secondly, the guide member prevents the strips cut from rolling in the rotating direction of the first shaft or the second shaft, so that the cut strips can be prevented from being bent and thus kept to an original shape of a rectangular post, thereby making it convenient to insert each strip into a diagnostic kit.

Thirdly, either the first guide member or the second guide member of the guide member has the grooves formed thereon, and accordingly, at the moment when the diagnostic reagent paper is cut by the knives, the diagnostic reagent paper is not supported against the guide member by means of the grooves, so that the pressed lines occurring by the pressurization of the guide member when the shear forces of the knives are applied to the strips may not be formed on the strips to allow the reagent on each strip to be dispersed well, without having any interference caused by the pressed lines, thereby reducing a defect rate of the strips and obtaining more accurate diagnostic results.

Fourthly, the guide member is rounded on both corners facing the diagnostic reagent paper, so that when the diagnostic reagent paper is guided by the guide member, the diagnostic reagent paper or strips may be prevented from scratching or tearing due to the guide member, thereby avoiding defects of the diagnostic reagent paper or strips.

Fifthly, the first shaft is adjustable in position on both sides thereof in a longitudinal direction thereof, so that a distance from the knives fitted to the second shaft may be adjusted easily, precisely, and accurately.

Lastly, since the distance adjustment is performed by means of the adjustment screws, an amount of rotation is converted into a straight line direction to perform concentricity adjustment, so that the concentricity adjustment of the knives may be made even to the unit of 0.01 mm, thereby making it possible to achieve precise concentricity adjustment.

BRIEF DESCRIPTION OF DRAWINGS

FIGS. 1*a* and 1*b* are side and top views showing a state where a diagnostic reagent paper is put in a device for cutting a diagnostic reagent paper into strips according to a first embodiment of the present invention and thus cut into strips.

FIG. 2 is a front view showing the device for cutting the diagnostic reagent paper into the strips according to the first embodiment of the present invention.

FIG. 3 is an exploded side view showing configurations of shafts of the device for cutting the diagnostic reagent paper into the strips according to the first embodiment of the present invention.

FIG. 4 is an enlarged view showing a portion "A" of FIG. 2 in which the first shaft and the second shaft are coupled to each other.

FIGS. 5*a* and 5*b* show a knife according to the first embodiment of the present invention, wherein FIG. 5*a* is a side view of the knife and FIG. 5*b* is a front view thereof.

FIGS. 6*a* and 6*b* show an adjustment nut according to the first embodiment of the present invention, wherein FIG. 6*a* is a front view of the adjustment nut and FIG. 6*b* is a side view showing an operating state where concentricity is held by the adjustment nut.

FIG. 7 is an exploded perspective view showing a guide member according to the first embodiment of the present invention.

FIG. 8 is a side view showing a first guide member according to the first embodiment of the present invention.

FIGS. 9*a* to 9*c* show a state where the diagnostic reagent paper is guided between the first and second shafts by the guide member according to the first embodiment of the present invention, wherein FIG. 9*a* is a side view showing a mounted state of the guide member, FIG. 9*b* is a plan view showing an example where pressed lines are formed when the diagnostic reagent paper is cut through the guide bar with no groove, and FIG. 9*c* is a plan view showing a state where pressed lines are not formed when the diagnostic reagent paper is cut through the guide member with a groove.

FIG. 10 is a photograph showing a mounted state of the guide member according to the first embodiment of the present invention.

FIG. 11 is a front view showing a configuration of a first shaft according to a second embodiment of the present invention.

BEST MODE FOR INVENTION

Hereinafter, embodiments of the present invention are disclosed in detail with reference to the attached drawings. All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

Before the present invention is disclosed and described, it is to be understood that the disclosed embodiments are merely exemplary of the invention, which can be embodied in various forms. However, this does not limit the invention within specific embodiments and it should be understood that the invention covers all the modifications, equivalents, and replacements within the idea and technical scope of the invention.

First Embodiment of the Invention

As shown FIGS. 1 to 10, a device for cutting a diagnostic reagent paper into strips according to a first embodiment of the present invention, which is adapted to cut the diagnostic reagent paper 10 made and provided to a shape of a long sheet into the strips 11 at once in a transverse direction thereof, includes a frame 100, a first shaft 200', a second shaft 200", and a guide member 300.

In specific, in a state where the guide member 300 passes through a space between the first shaft 200' and the second shaft 200", while supporting both surfaces of the diagnostic reagent paper 10 thereagainst, the first shaft 200' and the second shaft 200" each having blades 211 facing one another mounted thereon rotate to cut the diagnostic reagent paper 10 into the strips 11, so that as the diagnostic reagent paper 10 is cut into the strips 11 in the state where both surfaces thereof are being supported, it can be cut into the strips 11 to predetermined shapes, and further, the cut strips 11 can be prevented from being caught between knives 210' owing to the rotation of the first shaft 200' or the second shaft 200", thereby avoiding the strips 11 from being twisted, not cut, or bent to in advance prevent defects of the strips 11.

Further, the guide member 300 is configured to have grooves 312 adapted to prevent sections cut on the diagnostic reagent paper 10 by the knives 210' from being pressurized by the guide member 300, so that as the diagnostic reagent paper 10 is cut by the knives 210' in the state where both surfaces of the diagnostic reagent paper 10 are pressed by means of the guide member 300, the pressed lines of the diagnostic reagent paper 10 pressurized by the guide member 300 are not formed, thereby preventing a reagent from being not dispersed well onto the strips 11 because of the formation of the pressed lines to avoid the defects of the strips 11. Further, the guide member 300 has both rounded corners 311 on the surfaces facing the diagnostic reagent paper 10, so that when the guide member 300 serves to guide the diagnostic reagent paper 10 or the strips 11, it can guide the diagnostic reagent paper 10 or the strips 11 to allow the diagnostic reagent paper 10 to be easily cut into the strips 11, while preventing the diagnostic reagent paper 10 or the strips 11 from being damaged.

Moreover, the first shaft 200' includes the knives 210' whose blades 211 face each other and one spacer 210" alternately repeatedly fitted thereto, an adjustment nut 230 for fixing the knives 210' and the spacers 210" thereto, and at least two or more concentricity adjustment screws 231 fastened to the adjustment nut 230, so that when the adjustment nut 230 does not evenly pressurize the knives 210' and the spacers 210", the knives 210' and the spacers 210" are pressurized by means of the concentricity adjustment screws 231 to ensure concentricity adjustment thereof.

Further, the first shaft 200' has adjustment screws 271 fitted to both ends thereof to adjust a longitudinal movement thereof, so that the knives 210' fitted to the first shaft 200' can precisely interlock with the knives 210' fitted to the second shaft 200".

Hereinafter, the configuration of the device according to the first embodiment of the present invention will be explained in detail with reference to the attached drawings. A reference numeral "10" represents the diagnostic reagent paper provided to the shape of a band and having a reagent on one side thereof, and a reference numeral "11" represents a plurality of strips made by cutting the diagnostic reagent paper at once.

A. Frame

As shown in FIGS. 1*a* to 2, the frame 100 supports the first shaft 200' and the second shaft 200" as will be discussed later and the guide member 300 thereagainst and puts the diagnostic reagent paper 10 between the first shaft 200' and the second shaft 200" to allow the diagnostic reagent paper 10 to be cut into the plurality of strips 11. Like this, only if the frame 100 serves to support both ends of the first shaft 200' and the second shaft 200", it may be made to any shape, and in the drawings, the frame 100 is made to a lattice shape.

B. First Shaft and Second Shaft

As shown in FIGS. 1*a* to 3, both ends of the first shaft 200' and the second shaft 200" are fitted to the frame 100, so that the first shaft 200' and the second shaft 200" can rotate in place, and the outer peripheral surfaces thereof are configured to cut the single diagnostic reagent paper 10 into the plurality of strips 11 at once.

In this case, the first shaft 200' and the second shaft 200" have the same configuration as each other, and accordingly, an explanation of the first shaft 200' will be given for the convenience of the description, while a detailed explanation of the second shaft 200" is being avoided. Further, the first shaft 200' and the second shaft 200" rotate in place, respectively, as shown in FIG. 3, but desirably, gears 220 are fitted to the first shaft 200' and the second shaft 200" and thus interlock with each other, so that the first shaft 200' and the second shaft 200" rotate simultaneously.

To do this, as shown in FIGS. 2 and 3, the first shaft 200' has bearings 250" and 260 mounted on both ends thereof so that it can supportedly rotate in place. Further, the first shaft 200' has two knives 210' whose blades 211 face each other and one spacer 210" alternately fitted repeatedly to the outer peripheral surface thereof and the adjustment nut 230 fastened thereto to fix the knives 210' and the spacers 210" thereto. In this case, the first shaft 200' has key grooves 280 formed thereon to fixedly fit the knives 210' and the spacers 210" thereto so that the knives 210' and the spacers 210" cannot rotate in place.

(a). Knife

As shown in FIGS. 3 to 5*b*, each knife 210' has the shape of a disc. In this case, as shown in FIG. 4, the knife 210' has the blade 211 formed on one side periphery thereof, so that the knives 210' fitted to the first shaft 200' and the second shaft 200" can cut the diagnostic reagent paper 10 by using shear forces, like scissors.

According to a desirable embodiment of the present invention, each knife 210' includes the cutting edge 211' formed on the periphery of the blade 211 to allow the diagnostic reagent paper 10 to be easily cut into the strips 11. In this case, a first angle $\theta 1$ for forming the cutting edge 211' is greater than a second angle $\theta 2$ for forming the blade 211 so that when the diagnostic reagent paper 10 is cut into the strips 11, it can be cut well, while being slowly cut. In this case, desirably, the first angle $\theta 1$ is set in the range of 43 to 47° (most desirably at an angle of 45°), and the second angle $\theta 2$ is set in the range of 8 to 12° (most desirably at an angle of 10°).

Further, as shown in FIGS. 5*a* and 5*b*, the knife 210' has a mounting hole 212 formed on the center thereof so that it can be fitted to the first shaft 200' and a key groove 213 formed on one side of the mounting hole 212 to fit a key fitted to the corresponding key groove 280 thereto.

Like this, as shown in FIG. 4, the two knives 210' come into contact with each other to allow the respective blades 211 to face each other, and the spacer 210" as will be discussed later come into contact with one side of the two knives 210' brought into contact with each other, so that the two knives 210' and one spacer 210" are repeatedly fitted continuously to the first shaft 200', while being prevented from rotating. When the diagnostic reagent paper 10 is cut by the knives 210', accordingly, each strip 11 is cut in a space between the space between the facing two blades 211 and the space between the facing surfaces where no blades 211 exist, so that both side of each strip 11 is cut with a uniform force applied thereto, thereby preventing the strip 11 from being deformed or bent.

(b). Spacer

As shown in FIGS. 3 and 4, each spacer 210" comes into close contact with one side of the two knives 210' whose blades 211 face each other and is thus fitted to the first shaft 200'. In specific, the two knives 210' whose blades 211 face each other and one spacer 210" as a single unit are repeatedly fixedly fitted to the first shaft 200'.

In this case, the spacer 210" has the shape of a disc having a smaller diameter than each knife 210', thereby ensuring a space in which the knife 210' can cut the diagnostic reagent paper 10. In the same manner as the knife 210', further, the spacer 210" has to have no rotation with respect to the first shaft 200', and accordingly, the spacer 210" includes a mounting hole 212 and a key groove 213 formed thereon. They have been explained above, and a detailed explanation of them will be avoided.

According to a desirable embodiment of the present invention, as shown in FIG. 4, when the guide member 300 as will be discussed later is mounted, the guide member 300 is located on the spacers 210" so that the guide member 300 passes through the spacers 210" fitted to the first shaft 210' and the second shaft 210", and as the diagnostic reagent paper 10 passes through the guide member 300, it can be cut into the strips 11.

(c). Adjustment Nut

As shown in FIGS. 3, 6*a*, and 6*b*, the adjustment nut 230 is fastened to one side of the first shaft 200', desirably, to the first shaft 200' in a state where the knives 210' and the spacers 210" have been fitted to the first shaft 200', to fixedly support the knives 210' and the spacers 210" thereto, so that the knives 210' and the spacers 210" can be alignedly positioned with one another.

In specific, the adjustment nut 230 has at least two or more concentricity adjustment screws 231 adapted to pressurize the knives 210' and the spacers 210". As the adjustment nut 230 is fastened to the first shaft 200', as shown in FIG. 6*b*, an angle θ caused by a gap may be made according to characteristics of the nut, and accordingly, even though the adjustment nut 230 is firmly fastened to the first shaft 200', it is possible that the knives 210' and the spacers 210" may escape from the concentricity thereof. If the knives 210' and the spacers 210" are not concentric with one another, gaps may be produced to cause the knives 210' and the spacers 210" to move freely, thereby failing to uniformly cut the diagnostic reagent paper 10 or causing the cut strips 11 to be caught between the knives 210' and the spacers 210", so that defects of the strips 11 may occur. According to the present invention, therefore, even though the adjustment nut 230 does not tightly come into close contact with the knives 210' and the spacers 210", it can be tightly brought into close contact with the knives 210' and the spacers 210" by means of the concentricity adjustment screws 231, while maintaining the concentricity of the knives 210' and the spacers 210", so that the diagnostic reagent paper 10 can be cut into the strips 11 to the predetermined shapes and the cut strips 11 can be prevented from being caught to the gaps between the knives 210' and the spacers 210" to thus cause no defects of the strips 11.

According to a desirable embodiment of the present invention, at least two or more concentricity adjustment screws 231 are provided, while having a constant distance between the neighboring screws 231. Most desirably, eight concentricity adjustment screws 231 are provided, while having a constant distance between the neighboring screws 231. When the adjustment nut 230 is rotatingly adjusted, it cannot be recognized whether the angle θ caused by a gap is formed on any side of the adjustment screw 231, and accordingly, the concentricity adjustment screws 231 are arranged at small intervals so that the concentricity can be adjusted by means of the concentricity adjustment screws 231 located close to each other.

Like this, after the concentricity has been adjusted through the concentricity adjustment screws 231, the concentricity of the knives 210' is adjustably checked by means of a concentricity gauge, and the like, which will be easily understood to a person having ordinary skill in the art.

In this case, a reference numeral "290" not explained yet represents a distance adjustment spacer fitted to each of the first shaft 200' and the second shaft 200", which is fitted if it is desired to adjust the number of the knives 210' and the spacers 210" fitted to each shaft or their position in accordance with the length of the diagnostic reagent paper 10.

C. Guide Member

As shown in FIGS. 1*a* to 2 and FIGS. 4 and 7, the guide member 300 includes a first guide member 300' and a second guide member 300" and is mounted onto the frame 100. In specific, the first guide member 300' is located on the spacers 210" fitted to the first shaft 200', and the second guide member 300" is located on the spacers 210" fitted to the second shaft 200", so that the first guide member 300' and the second guide member 300" pass through the first shaft 200' and the second shaft 200". A given gap is formed between the first guide member 300' and the second guide member 300" to support both surfaces of the diagnostic reagent paper 10.

As shown in FIGS. 4 and 7 to 10, the guide member 300 includes the first guide member 300' and the second guide member 300", and an explanation of such a configuration of the guide member 300 will be given in detail below.

(a). First Guide Member

As shown in FIGS. 7 and 8, the first guide member 300' has a plurality of guide bars 310 protruding side by side therefrom to a single flat shape and thus fitted to the spaces between the knives 210' fitted to the first shaft 210' and the second shaft 210".

In this case, as shown in FIGS. 7 and 8, each guide bar 310 has both rounded corners 311 on the surface facing the diagnostic reagent paper 10. As a result, when the guide bars 310 come into contact with the diagnostic reagent paper 10 to guide it, the rounded corners 311 prevent the surface of the diagnostic reagent paper 10 from being scratched or damaged, thereby in advance avoiding the occurrence of defects of the strips 11.

Further, as shown in FIGS. 7 to 9*c*, each guide bar 310 has a groove 312 formed on the surface facing the diagnostic reagent paper 10. In this case, the grooves 312 are located on given portions of the guide bars 310 where the diagnostic reagent paper 10 is cut by the knives 210' when the knives 210' fitted to the first shaft 210' and the second shaft 210" cut the diagnostic reagent paper 10, so that at the moment when the diagnostic reagent paper 10 is cut by the knives 210', the diagnostic reagent paper 10 is not supported against the guide bars 310, thereby preventing the formation of pressed lines. In more specific, as shown in FIG. 9*b*, in the case of the guide bar having no groove, pressed lines occur between the guide bar and the lines cut by the knives due to the pressed forces of the knives and the guide bar for supporting the diagnostic reagent paper on the opposite side to the knives, when the diagnostic reagent paper 10 is cut by the knives. The pressed lines are formed by the pressurization of the guide bar because the diagnostic reagent paper 10 is pressed by the cutting forces of the knives applied to both surfaces of the diagnostic reagent paper 10. According to the present invention, the grooves 312 are formed on the given portions of the guide bars 310 where the diagnostic reagent paper 10 is cut by the knives 210' when the knives 210' fitted to the first shaft 210' and the second shaft 210" cut the diagnostic reagent paper 10, so that when the diagnostic reagent paper 10 is cut by the knives 210', the cut portions of the diagnostic reagent paper 10 are not supported against the guide bars 310, thereby preventing the formation of the pressed lines caused by the guide bars 310.

Further, as shown in FIG. 8, the first guide member 300' has an entrance portion adapted to support the guide bars 310 and guide the diagnostic reagent paper 10 to the space between the knives 210', and the entrance portion becomes narrow slantly toward the inside of the first guide member 300', so that when the diagnostic reagent paper 10 is inserted into the space between the second guide member 300" and the first guide member 300', it can be inserted thereinto with ease.

Further, as shown in FIGS. 8 to 9*c*, the first guide member 300' is desirably configured to allow a thickness T of the portion supporting the guide bars 310 to be greater than a thickness t of each guide bar 310. As a result, the first guide member 300' may not be easily bent or deformed so that it can stably guide the diagnostic reagent paper 10.

(b). Second Guide Member

As shown in FIGS. 7 and 8, the second guide member 300" serves to guide the diagnostic reagent paper 10 in a state of placing the diagnostic reagent paper 10 thereon to thus push and insert the diagnostic reagent paper 10 into the space between the first guide member 300' and the second guide member 300". The second guide member 300" has a plurality of guide bars 310 protruding side by side therefrom in the same manner as the guide bars 310 of the first guide member 300', but the guide bars 310 of the second guide member 300" are located to cross the guide bars 310 of the first guide member 300'. The crossing of the guide bars 310 enables the guide bars 310 to pass through the spaces between the knives 210' crossingly fitted to the first shaft 200' and the second shaft 200".

In specific, as shown in FIGS. 7 and 8, the guide bars 310 of the second guide member 300" may have the same rounded corners 311 and grooves 312 as of the first guide member 300'. However, it is desirable that the grooves 312 are not formed on the guide bars 310 of the second guide member 300". A material for easily dispersing a reagent and the like is generally attached to one surface of the paper like the diagnostic reagent paper 10, and accordingly, the grooves 312 are formed on the guide bars 310 of the first guide member 300' for supporting the surface where the material for dispersing the reagent is attached to thus prevent the material from being pressurized, but the pressed lines are not easily formed on the opposite surface to the surface because the opposite surface is hard, so that even if the grooves 312 are not formed on the second guide member 300", it does not matter. Of course, it is possible that the grooves 312 are formed on the guide bars 310 of the second guide member 300" in the same manner as the first guide member 300'.

The guide member 300 having the above-mentioned configuration serves to support the diagnostic reagent paper 10 until the diagnostic reagent paper 10 passes through the space between the first shaft 210' and the second shaft 210" and is thus cut into the strips 11, except the moment when the diagnostic reagent paper 10 is cut by the knives 210', as shown in FIGS. 1*a* and 1*b*. Accordingly, as shown in FIG. 4, the guide member 300 serves to stably the diagnostic reagent paper 10 fitted to the spaces formed to the rectangular shapes whose corners are rounded, so that the diagnostic reagent paper 10 can be cut into the strips 11 by means of the knives 210' and the cut strips 11 are discharged to the outside from the first shaft 210' and the second shaft 210", without being rolled onto the first shaft 210' and the second shaft 210". Further, the portions of the diagnostic reagent paper 10 cut by the knives 210' are not supported against the guide member 300, thereby preventing the formation of the pressed lines on the strips 11.

Accordingly, as the diagnostic reagent paper 10 passes through the guide member 300, it can be cut well into the strips 11 to the predetermined sizes, while the strips 11 are being prevented from being bent, rolled, and deformed, thereby reducing a defect rate thereof. Further, at the moment when the diagnostic reagent paper 10 is cut, it is not supported against the guide member 300, and accordingly, the pressed lines are not formed when the forces of the knives 210' are applied to the diagnostic reagent paper 10, thereby reducing a defect rate of the strips 11.

As described above, while both surfaces of the diagnostic reagent paper are being supported against the guide member mounted to pass through the space between the first shaft and the second shaft, the diagnostic reagent paper is cut into the strips, so that the diagnostic reagent paper is cut into the strips to the predetermined sizes and the cut strips are not rolled onto the first shaft or the second shaft to prevent the edges or ends thereof from being rolled or bent. Further, the portions of the diagnostic reagent paper cut by the knives are not supported against the guide member to prevent the formation of the pressed lines by the support of the guide member when the pressurizing forces of the knives are applied to the diagnostic reagent paper, thereby avoiding defects of the strips.

Second Embodiment of the Invention

As shown FIG. 11, a device for cutting a diagnostic reagent paper into strips according to a second embodiment of the present invention has the same configuration as according to the first embodiment of the present invention, but it is different from the device according to the first embodiment of the present invention in that components for moving the first shaft 210' in a longitudinal direction thereof may be additionally provided. Accordingly, the additional components will be explained below, while detailed explanations of the same components as the first embodiment of the present invention are being avoided.

According to the second embodiment of the present invention, as shown in FIG. 11, the first shaft 200' moves in the longitudinal direction thereof to adjust the distances between the knives 210' fitted to the first shaft 200' and the second shaft 200" so that the diagnostic reagent paper 10 can be cut well.

To do this, as shown in FIG. 11, the first shaft 200' has a taper bearing 250' fitted to one side thereof so that even though the first shaft 200' moves in the longitudinal direction thereof, the taper bearing 250' stably supports the first shaft 200'. In this case, the taper bearing 250' and the bearing 250" as mentioned above are fitted to the first shaft 200' and firmly supported inside the frame 100, without being pushed backward. In specific, a compression spring 240 is fitted between the first shaft 200' and the taper bearing 250', and if the first shaft 200' is pressurized in the longitudinal direction thereof, the compression spring 240 applies a repulsive force in the opposite direction to the pressurizing direction to perform shock absorption. Further, the first shaft 200' has a thrust bearing 270 supportingly fitted to the end thereof, and the thrust bearing 270 comes into contact with the adjustment screw 271 fitted to the frame 100 and rotating in place.

In addition, as shown in FIG. 11, the first shaft 200' has a thrust bearing 270 supportingly fitted to the other side thereof, and the thrust bearing 270 comes into contact with the adjustment screw 271 fitted to the frame 100. In this case, the adjustment screw 271 rotates when length adjustment is needed, that is, when there is a need to adjust the distances between the knives 210' fitted to the first shaft 200' and the knives 210' fitted to the second shaft 200", to move the first shaft 200' moves in the longitudinal direction thereof, to push the thrust bearing 270, and to adjust the distances. In this case, the first shaft 200' is adjusted in length, while always having the shock absorption under the elastic support of the compression spring 240, so that the adjustment of the distances between the knives 210' can be achieved, and even though the knives 210' cross each other, they can return to their original position by means of the shock absorption of the compression spring 240.

As mentioned above, the device according to the second embodiment of the present invention is configured to allow the first shaft to be adjustable in length in the longitudinal direction thereof, while the first shaft is being elastically supported, and the positions of the knives can be easily adjusted if needed, thereby stably cutting the diagnostic reagent paper into the strips, and through the elastic support, further, the shock absorption is generated from the first shaft to accurately cut the diagnostic reagent paper in position into the given shapes, while protecting the knives. Further, the first shaft is adjusted in length in the longitudinal direction thereof, while being supported against the thrust bearings, thereby allowing the distances between the knives fitted to the first shaft and the second shaft or the crossing of the knives to be easily adjusted.

EXPLANATIONS OF REFERENCE NUMERALS

10: Diagnostic reagent paper
11: Strip
100: Frame
200': First shaft
200": Second shaft
210': Knife
210": Spacer
230: Adjustment nut
231: Concentricity adjustment screw
240: Compression spring
270: Thrust bearing
271: Adjustment screw
280: Key groove
300: Guide member
300', 300": First and second guide members
310: Guide bar
311: Rounded corner
312: Groove

The invention claimed is:

1. A device for cutting a diagnostic reagent paper into strips, which is adapted to cut the diagnostic reagent paper (10) provided to the shape of a sheet into the strips (11) at once in a transverse direction thereof, comprising:

a frame (100); a first shaft (200') having two disc-shaped knives (210') whose blades (211) face each other and one spacer (210") alternately fixedly fitted repeatedly thereto, without rotating, and an adjustment nut (230) fastenedly fixed to at least one side thereof to prevent the knives (210') and the spacers (210") from escaping therefrom; a second shaft (200") having two disc-shaped knives (210') whose blades (211) face each other and one spacer (210") alternately fixedly fitted repeatedly thereto, without rotating, and an adjustment nut (230) fastenedly fixed to at least one side thereof to prevent the knives (210') and the spacers (210") from escaping therefrom; and a guide member (300) mounted onto the frame (100) and having a first guide member (300') disposed on the spacers (210") of the first shaft (200') and a second guide member (300") disposed on the spacers (210") of the second shaft (200"), so that the diagnostic reagent paper (10) is supportedly guided, passes through a space between the first guide member (300') and the second guide member (300"), and is thus cut, wherein as the first shaft (200') and the second shaft (200") are mounted on the frame (100) to rotate in place together, the knives (210") cut the diagnostic reagent paper (10) into the plurality of strips (11) by means of the shear forces thereof, the first shaft (200') and the second shaft (200") each having at least two or more concentricity adjustment screws (231) fastened on an imaginary circle with respect to the center thereof to each adjustment nut (230) fastenedly fixed thereto to pressurize the knives (210') and the spacers (210") in the transverse direction and to thus adjust the concentricity of the knives (210') and the spacers (210"), and the first guide member (300') and the second guide member (300") each has a plurality of guide bars (310) protruding therefrom and thus fitted to the spaces between the crossing knives (210'), each guide bar (310) having both rounded corners (311) on the surface facing the diagnostic reagent paper (10) passes through the space between the first guide member (300') and the second guide member (300"), and the guide bars (310) of at least one of the first guide member (300') and the second guide member (300") having grooves (321) formed on given portions where the diagnostic reagent paper (10) is cut by the knives (210') fitted to the first shaft (200') and the second shaft (200") to prevent the diagnostic reagent paper (10) from being pressed by the guide bars (310).

2. The device according to claim 1, wherein a first angle (θ1) for forming a cutting edge (211') formed on the periphery of each knife (210') is greater than a second angle (θ2) for forming the blade (211).

3. The device according to claim 2, wherein the first angle (θ1) is set in the range of 43 to 47°, and the second angle (θ2) is set in the range of 8 to 12°.

4. The device according to claim 3, wherein the first shaft (200') has a compression bearing (240), a taper bearing (250'), a bearing (250"), and a thrust bearing (270) sequentially fitted to one side thereof, the thrust bearing (270) being connected to an adjustment screw (271) disposed on the first shaft (200') to rotate in place, so that the first shaft (200') is adjusted in length in a longitudinal direction thereof, and the first shaft (200') has a bearing (260) and a thrust bearing (270) sequentially fitted to the other side thereof, the bearing (260) being adapted to support the rotation and longitudinal movement of the first shaft (200') and the thrust bearing (270) being connected to an adjustment screw (271) disposed on the frame (100) to support the rotation of the first shaft (200') as the adjustment screw (271) rotates in place.

5. The device according to claim 2, wherein the first shaft (200') has a compression bearing (240), a taper bearing (250'), a bearing (250"), and a thrust bearing (270) sequentially fitted to one side thereof, the thrust bearing (270) being connected to an adjustment screw (271) disposed on the first shaft (200') to rotate in place, so that the first shaft (200') is adjusted in length in a longitudinal direction thereof, and the first shaft (200') has a bearing (260) and a thrust bearing (270) sequentially fitted to the other side thereof, the bearing (260) being adapted to support the rotation and longitudinal movement of the first shaft (200') and the thrust bearing (270) being connected to an adjustment screw (271) disposed on the frame (100) to support the rotation of the first shaft (200') as the adjustment screw (271) rotates in place.

6. The device according to claim 1, wherein the first guide member (300') has a greater thickness (T) of a portion supporting the guide bars (310) than a thickness (t) of each guide bar (310), and an entrance portion of the first guide member (300'), into which the diagnostic reagent paper (10) is inserted, becomes low in thickness toward a direction into which the diagnostic reagent paper (10) is inserted.

7. The device according to claim 6, wherein the first shaft (200') has a compression bearing (240), a taper bearing (250'), a bearing (250"), and a thrust bearing (270) sequentially fitted to one side thereof, the thrust bearing (270) being connected to an adjustment screw (271) disposed on the first shaft (200') to rotate in place, so that the first shaft (200') is adjusted in length in a longitudinal direction thereof, and the first shaft (200') has a bearing (260) and a thrust bearing (270) sequentially fitted to the other side thereof, the bearing (260) being adapted to support the rotation and longitudinal movement of the first shaft (200') and the thrust bearing (270) being connected to an adjustment screw (271) disposed on the frame (100) to support the rotation of the first shaft (200') as the adjustment screw (271) rotates in place.

8. The device according to claim 1, wherein the first shaft (200') has a compression bearing (240), a taper bearing (250'), a bearing (250"), and a thrust bearing (270) sequentially fitted to one side thereof, the thrust bearing (270) being connected to an adjustment screw (271) disposed on the first shaft (200') to rotate in place, so that the first shaft (200') is adjusted in length in a longitudinal direction thereof, and the first shaft (200') has a bearing (260) and a thrust bearing (270) sequentially fitted to the other side thereof, the bearing (260) being adapted to support the rotation and longitudinal movement of the first shaft (200') and the thrust bearing (270) being connected to an adjustment screw (271) disposed on the frame (100) to support the rotation of the first shaft (200') as the adjustment screw (271) rotates in place.

* * * * *